US008386079B1

(12) United States Patent
Kohler et al.

(10) Patent No.: US 8,386,079 B1
(45) Date of Patent: Feb. 26, 2013

(54) SYSTEMS AND METHODS FOR DETERMINING SEMANTIC INFORMATION ASSOCIATED WITH OBJECTS

(75) Inventors: Damon Kohler, Munich (DE); Ryan Hickman, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/284,089

(22) Filed: Oct. 28, 2011

(51) Int. Cl.
G05B 19/04 (2006.01)
G05B 19/18 (2006.01)
(52) U.S. Cl. .................. 700/246; 700/248; 700/250
(58) Field of Classification Search .............. None
See application file for complete search history.

(56) References Cited

U.S. PATENT DOCUMENTS

| | | | | |
|---|---|---|---|---|
| 6,016,385 | A * | 1/2000 | Yee et al. | 700/245 |
| 6,754,560 | B2 * | 6/2004 | Fujita et al. | 700/245 |
| 6,816,753 | B2 * | 11/2004 | Sakamoto et al. | 700/245 |
| 7,010,526 | B2 | 3/2006 | Denesuk et al. | |
| 7,219,064 | B2 * | 5/2007 | Nakakita et al. | 704/275 |
| 7,668,797 | B2 * | 2/2010 | Kuvich | 706/62 |
| 2008/0243305 | A1 * | 10/2008 | Lee et al. | 700/246 |
| 2010/0174739 | A1 | 7/2010 | Mons et al. | |
| 2010/0299360 | A1 | 11/2010 | Yi | |

FOREIGN PATENT DOCUMENTS

WO WO2006/083958 8/2006

OTHER PUBLICATIONS

Learning Human Skills.pdf (Mohammed Yeasin and Subhasis Chaudhuri, Toward Automatic Robot Programming: Learning Human Skill from Visual Data, Feb. 2000, IEEE, vol. 30, No. 1, pp. 180-185).*
Narasimha et al., "LiDDM: A Data Mining System for Linked Data", LDOW2011, Mar. 29, 2011, Hyderabad, India.

* cited by examiner

*Primary Examiner* — Khoi Tran
*Assistant Examiner* — Bao Long T Nguyen
(74) *Attorney, Agent, or Firm* — McDonnell Boehnen Hulbert & Berghoff LLP (57) ABSTRACT

Methods and systems for determining semantic information associated with objects are provided. An example method includes receiving information associated with an object and information associated with a contextual situation of a robotic device from the robotic device. For example, the information associated with the contextual situation may include information associated with an environment in which the robotic device is configured to operate. The method may further include performing a search of a database for information associated with the object, and receiving results of the search. The method may also include a computing system determining semantic information associated with a use of the object based on the results of the search. The use of the object may be based on the information associated with the contextual situation of the robotic device. According to the method, the semantic information may be stored as supplemental information associated with the object.

13 Claims, 9 Drawing Sheets

SYSTEMS AND METHODS FOR DETERMINING SEMANTIC INFORMATION ASSOCIATED WITH OBJECTS

FIELD

This disclosure relates to cloud computing, and in examples, to determining semantic information associated with objects in a database.

BACKGROUND

Cloud computing refers to provision of computational resources via a computer network. In a traditional model of computing, both data and software are fully contained on a user's computer. In cloud computing, however, the user's computer may contain relatively little software or data (perhaps a minimal operating system and web browser, for example), and may serve as a display terminal for processes occurring on a network of computers. A common shorthand provided for a cloud computing service (or even an aggregation of existing cloud services) is "the cloud".

Cloud computing has been referred to as "client-server computing", however, there may be distinctions between general cloud computing and client-server computing. For example, client-server computing may include a distributed application structure that partitions tasks or workloads between providers of a resource or service (e.g., servers), and service requesters (e.g., clients). Client-server computing generally involves a one-to-one relationship between the server and the client, whereas cloud computing includes generic services that can be accessed by generic clients (e.g., a one-to-one relationship or connection may not be required). Thus, cloud computing generally includes client-server computing, and additional services and functionality.

Cloud computing may free users from certain hardware and software installation and maintenance tasks through use of simpler hardware on the user's computer that accesses a vast network of computing resources (e.g., processors, hard drives, etc.). Sharing of resources may reduce cost to individuals. Thus, any computer connected to the cloud may be connected to the same pool of computing power, applications, and files. Users can store and access personal files such as music, pictures, videos, and bookmarks or play games or use productivity applications on a remote server rather than physically carrying around a storage medium, such as a DVD or thumb drive.

SUMMARY

This disclosure may disclose, inter alia, systems and methods for determining semantic information associated with objects in a database.

In one example, a method is provided that comprises receiving information associated with an object and information associated with a contextual situation of a robotic device from the robotic device. The information associated with the contextual situation may include information associated with an environment in which the robotic device is configured to operate. The method may also include performing a search of a database for information associated with the object, and receiving results of the search. Additionally, the method may include a computing system having a processor and a memory determining semantic information associated with a use of the object, based on the results of the search. The use of the object may be based on the information associated with the contextual situation of the robotic device. The method may further include storing the semantic information as supplemental information associated with the object.

Any of the methods described herein may be provided in a form of instructions stored on a non-transitory, computer readable medium, that when executed by a computing device, cause the computing device to perform functions of the method. Further examples may also include articles of manufacture including tangible computer-readable media that have computer-readable instructions encoded thereon, and the instructions may comprise instructions to perform functions of the methods described herein.

In another example, a computer-readable medium having stored thereon instructions executable by a computing device to cause the computing device perform functions is provided. The functions may comprise receiving information associated with an object and information associated with a contextual situation of a robotic device from the robotic device. The information associated with the contextual situation may include information associated with an environment in which the robotic device is configured to operate. The functions also may comprise performing a search of a database for information associated with the object, and receiving results of the search. Additionally, the functions may include, based on the results of the search, determining semantic information associated with a use of the object. The use of the object may be based on the information associated with the contextual situation of the robotic device. The functions may further comprise storing the semantic information as supplemental information associated with the object.

The computer readable medium may include a non-transitory computer readable medium, for example, such as computer-readable media that stores data for short periods of time like register memory, processor cache and Random Access Memory (RAM). The computer readable media may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage medium.

In addition, circuitry may be provided that is wired to perform logical functions in any processes or methods described herein.

In still further examples, any type of devices may be used or configured to perform logical functions in any processes or methods described herein.

In another example, a system is provided that comprises a robotic device and a computing component. The robotic device may be configured to receive information associated with an object and information associated with a contextual situation of the robotic device. The information associated with the contextual situation may include information associated with an environment in which the robotic device is configured to operate. The robotic device may be further configured to transmit the information associated with the object and the information associated with the contextual situation to the computing component via a network. The computing component may comprise a processor and a memory coupled to the processor and may be capable of communicating with the robotic device over the network. The computing component may be configured to perform a search of a database for information associated with the object. The computing component may also be configured to determine semantic information associated with a use of the object based on the results of the search. The use of the object may be based on the information associated with the contextual situation. The computing component may be further configured to transmit the semantic information to the robotic device.

In yet further examples, any type of devices may be used or configured as means for performing functions of any of the methods described herein (or any portions of the methods described herein).

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, methods and systems for determining semantic information associated with objects. An example method includes receiving information associated with an object and information associated with a contextual situation of a robotic device from the robotic device. In some examples, the information associated with the object may include a three-dimensional model of the object stored in a three-dimensional object database, or a model stored in a database including shapes of objects. The information associated with the contextual situation may include information associated with an environment in which the robotic device is configured to operate, for example. In other instances, the information associated with the contextual situation may include a location of the robotic device (e.g., geographic coordinates, a location within a building, etc.), a task given to the robotic device to perform, capabilities of the robotic device, information associated with additional objects in the environment, or sensory data associated with the environment received by the robotic device (e.g., spoken words or background noises), among other possible information.

The method may also include performing a search of a database for information associated with the object. In one example, a web search using an internet search engine may be performed. The web search may include an image search, document search, video search, audio search, three-dimensional object search, and/or product search, for example. Results of the search may be received including, for example, information from webpages, discussion forums, blog posts, picture galleries, videos, images, three-dimensional objects, audio files, etc. associated with the object. In an instance in which the information associated with the object may comprise a model of the object, the search may be performed based on the model.

Additionally, the method may include a computing system having a processor and a memory determining semantic information associated with a use of the object based on the results of the search. In one example, the use of the object may be based on the information associated with the contextual situation of the robotic device. The semantic information may further include information describing how the object is used, why the object is used, what the object is used for, or when the object is used. In other examples, the semantic information may include information useful to a robotic device, such as instructions for use, uses cases for products, etc. Thus, based on the contextual situation of the robotic device, things that humans perceive naturally about an object may be determined.

According to the method, the semantic information may be stored (e.g., in a memory of the robotic device or a database in a computer or cloud) as supplemental information associated with the object.

In some examples, receiving the information associated with the object and the information associated with the contextual situation may include the robotic device determining the information associated with the object and the information associated with the contextual situation. The robotic device may also request the semantic information associated with the use of the object, and receive the semantic information. For example, the robotic device may receive the semantic information in order to utilize the semantic information to interact with the object.

Figure 1:
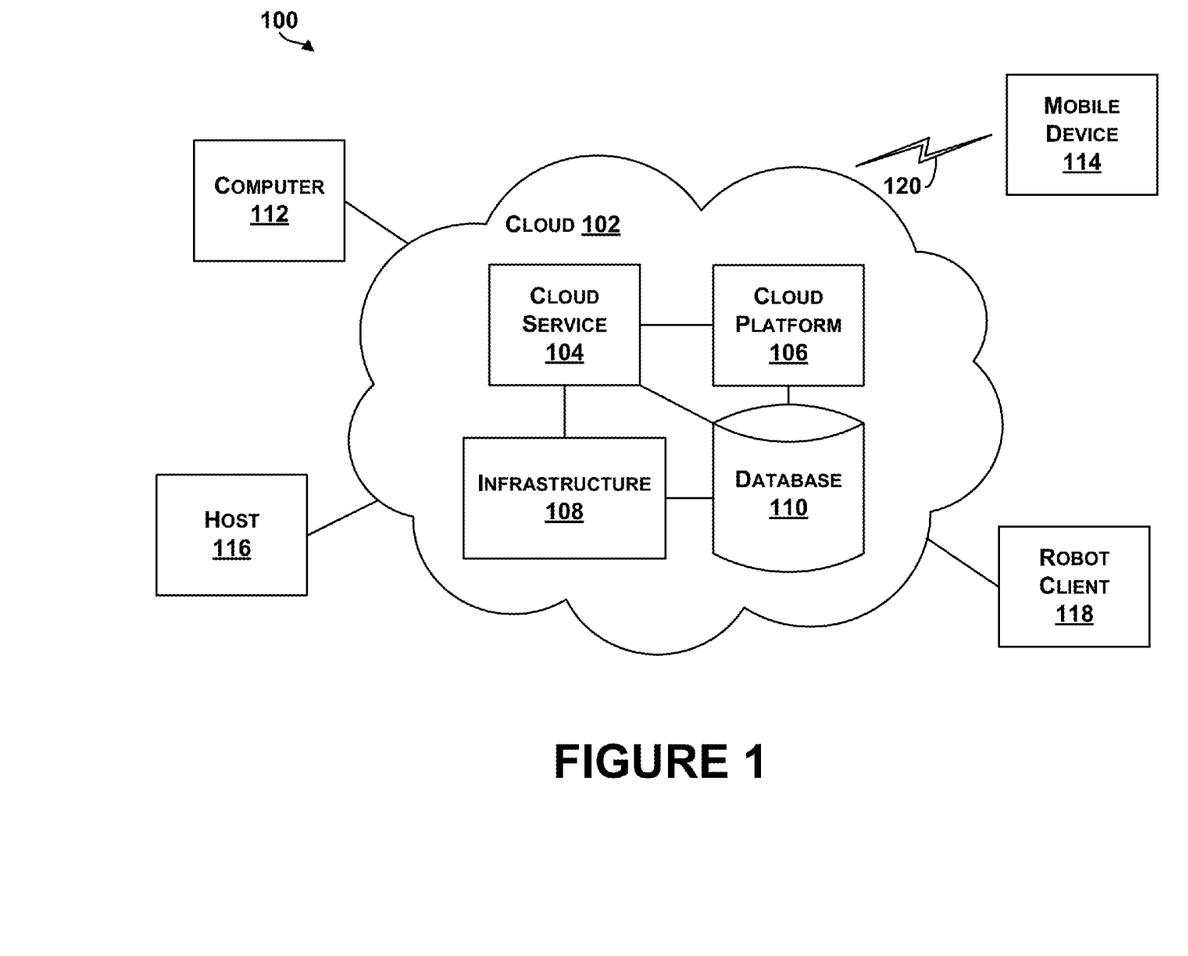
FIG. 1 is an example system for cloud-based computing.

Referring now to the figures, FIG. 1 is an example system 100 for cloud-based computing. Cloud-based computing generally refers to networked computer architectures in which application execution and storage may be divided, to some extent, between client and server devices. A "cloud" may refer to a service or a group of services accessible over a network (e.g., Internet) by client and server devices, for example.

In one example, any computer connected to the cloud may be connected to the same pool of computing power, applications, and files. Thus, cloud computing enables a shared pool of configurable computing resources (e.g., networks, servers, storage, applications, and services) that can be provisioned and released with minimal management effort or service provider interaction. Users can store and access personal files such as music, pictures, videos, and bookmarks or play games or use productivity applications on a remote server rather than physically carrying around a storage medium.

As an example, in contrast to a predominately client-based or server-based application, a cloud-based application may store copies of data and/or executable program logic at remote server devices, while allowing client devices to download at least some of this data and program logic as needed for execution at the client devices. In some examples, downloaded data and program logic can be tailored to capabilities of specific client devices (e.g., a personal computer, tablet, or mobile phone, or robot) accessing the cloud based application. In addition, dividing application execution and storage between the client and server devices allows more processing to be performed by the server devices taking advantage of server devices processing power and capability, for example.

Cloud-based computing can also refer to distributed computing architectures in which data and program logic for a cloud-based application are shared between one or more client devices and/or server devices on a near real-time basis. Parts of this data and program logic may be dynamically delivered, as needed or otherwise, to various clients accessing the cloud-based application. Details of the architecture may be transparent to users of client devices. Thus, a PC user or robot client device accessing a cloud-based application may not be aware that the PC or robot downloads program logic and/or data from the server devices, or that the PC or robot offloads processing or storage functions to the server devices, for example.

In FIG. 1, a cloud 102 includes a cloud service 104, a cloud platform 106, a cloud infrastructure 108, and a database 110. The cloud 102 may include more or fewer components, and each of the cloud service 104, the cloud platform 106, the cloud infrastructure 108, and the database 110 may comprise multiple elements as well. Thus, one or more of the described functions of the system 100 may be divided up into additional functional or physical components, or combined into fewer functional or physical components. In some further examples, additional functional and/or physical components may be added to the examples illustrated by FIG. 1. Delivery of cloud computing may involve multiple cloud components communicating with each other over application programming interfaces, such as web services and three-tier architectures, for example.

The cloud 102 may represent a networked computer architecture, and in one example, the cloud service 104 represents a queue for handling requests from client devices. The cloud platform 106 may include a frontend of the cloud and may be coupled to the cloud service 104 to perform functions to interact with client devices. The cloud platform 106 may include applications used to access the cloud 102 via a user interface, such as a web browser. The cloud infrastructure 108 may include service application of billing components of the cloud 102, and thus, may interact with the cloud service 104. The database 110 may represent storage capabilities by the cloud 102, and thus, may be accessed by any of the cloud service 104, the cloud platform 106, and/or the cloud infrastructure 108.

The system 100 includes a number of client devices coupled to or configured to be capable of communicating with components of the cloud 102. For example, a computer 112, a mobile device 114, a host 116, and a robot client 118 are shown coupled to the cloud 102. Of course, more or fewer client devices may be coupled to the cloud 102. In addition, different types of client devices may be coupled to the cloud 102. For example, any of the client devices may generally comprise a display system, memory, and a processor.

The computer 112 may be any type of computing device (e.g., PC, laptop computer, etc.), and the mobile device 114 may be any type of mobile computing device (e.g., laptop, mobile telephone, cellular telephone, etc.).

The host 116 may be any type of computing device or transmitter including a laptop computer, a mobile telephone, etc., that is configured to transmit data to the cloud 102.

The robot client 118 may comprise any computing device that has connection abilities to the cloud 102 and that has an actuation capability (e.g., electromechanical capabilities). A robot may further be a combination of computing devices. In some examples, the robot 118 may collect data and upload the data to the cloud 102. The cloud 102 may be configured to perform calculations or analysis on the data and return processed data to the robot client 118. In some examples, as shown in FIG. 1, the cloud 102 may include a computer that is not co-located with the robot client 118. In other examples, the robot client 118 may send data to a second client (e.g., computer 112) for processing.

Any of the client devices may include additional components. For example, the robot client 118 may include one or more sensors, such as a gyroscope or an accelerometer to measure movement of the robot client 118. Other sensors may further include any of Global Positioning System (GPS) receivers, infrared sensors, optical sensors, biosensors, Radio Frequency identification (RFID) systems, wireless sensors, and/or compasses, among others, for example.

In addition, any of the client devices may include an integrated user-interface (UI) that allows a user to interact with the device. For example, the robot client 118 may include various buttons and/or a touchscreen interface that allow a user to provide input. As another example, the robot client device 118 may include a microphone configured to receive voice commands from a user. Furthermore, the robot client 118 may include one or more interfaces that allow various types of user-interface devices to be connected to the robot client 118.

In FIG. 1, communication links between client devices and the cloud 102 may include wired connections, such as a serial or parallel bus. Communication links may also be wireless links, such as link 120, which may include Bluetooth, IEEE 802.11 (IEEE 802.11 may refer to IEEE 802.11-2007, IEEE 802.11n-2009, or any other IEEE 802.11 revision), or other wireless based communication links.

In other examples, the system 100 may include access points through which the client devices may communicate with the cloud 102. Access points may take various forms, for example, an access point may take the form of a wireless access point (WAP) or wireless router. As another example, if a client device connects using a cellular air-interface protocol, such as a CDMA or GSM protocol, an access point may be a base station in a cellular network that provides Internet connectivity via the cellular network.

As such, the client devices may include a wired or wireless network interface through which the client devices can connect to the cloud 102 (or access points). As an example, the client devices may be configured use one or more protocols such as 802.11, 802.16 (WiMAX), LTE, GSM, GPRS, CDMA, EV-DO, and/or HSPDA, among others. Furthermore, the client devices may be configured use multiple wired and/or wireless protocols, such as "3G" or "4G" data connectivity using a cellular communication protocol (e.g., CDMA, GSM, or WiMAX, as well as for "WiFi" connectivity using 802.11). Other examples are also possible.

Figure 2A:
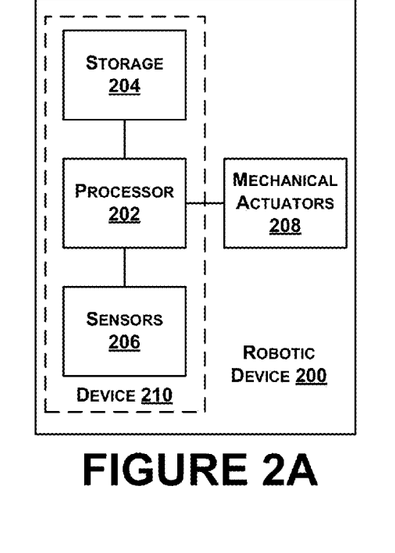
FIGS. 2A-2C are example illustrations of robotic devices.
Figure 2B:
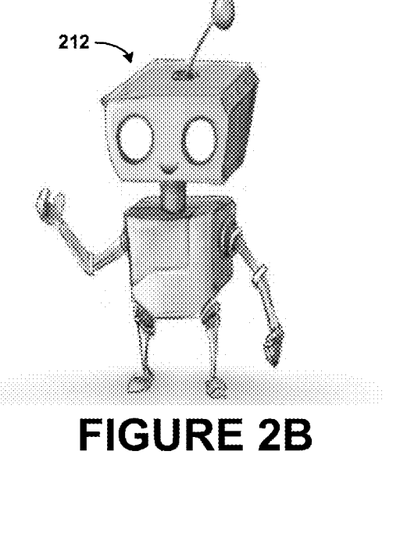
Figure 2C:
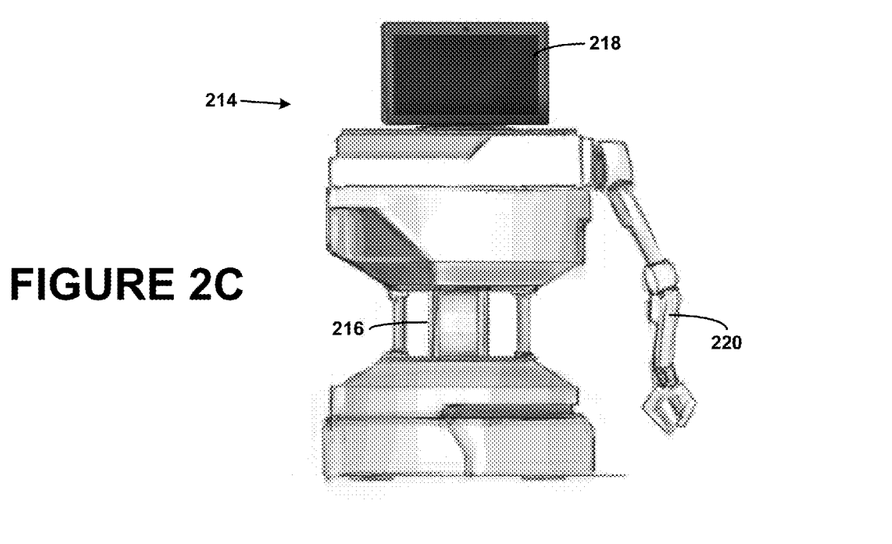

FIGS. 2A-2C are example illustrations of robotic devices. Any of the robots illustrated in FIGS. 2A-2C may be configured to operate according to example methods described herein, or according to instructions received from devices that may be configured to operate according to example methods described herein.

An example illustration of a robotic device 200 is shown in FIG. 2A. In one example, the robotic device 200 is configured as a robot. In some examples, a robot may contain computer hardware, such as a processor 202, memory or data storage 204, and one or more sensors 206. For example, a robot controller (e.g., processor 202, computing system, and sensors 206) may all be custom designed for a specific robot. The robot may have a link to access cloud servers (as shown in FIG. 1). A wired link may include, for example, a parallel bus or a serial bus such as a Universal Serial Bus (USB). A wireless link may include, for example, Bluetooth, IEEE 802.11, Cellular (such as GSM, CDMA, UMTS, EV-DO, WiMAX, or LTE), or Zigbee, among other possibilities.

In one example, the storage 204 may be used for compiling data from various sensors 206 of the robotic device 200 and storing program instructions. The processor 202 may be coupled to the storage 204 and may be configured to control the robotic device 200 based on the program instructions. The processor 202 may also be able to interpret data from the various sensors 206 on the robot. Example sensors may include a camera, smoke sensors, light sensors, radio sensors, infrared sensors, microphones, speakers, gyroscope, accelerometer, distance sensors, a camera, radar, capacitive sensors and touch sensors, etc. Example distance sensors include infrared ranging sensors, photoelectric distance sensors, proximity sensors, ultrasonic sensors, radar, or other types of sensors that may provide outputs used to determine a distance of the robotic device 200 to an object.

The robotic device 200 may also have components or devices that allow the robotic device 200 to interact with an environment of the robotic device 200. For example, the robotic device 200 may have a camera to provide images of a field of view of the environment as well as mechanical actuators 208, such as motors, wheels, movable arms, etc., that enable the robotic device 200 to move or interact with the environment.

In some examples, various sensors and devices on the robotic device 200 may be modules. Different modules may be added or removed from the robotic device 200 depending on requirements. For example, in a low power situation, a robot may have fewer modules to reduce power usages. However, additional sensors may be added as needed. To increase an amount of data a robot may be able to collect, additional sensors may be added, for example.

In some examples, the robotic device 200 may be configured to receive a device, such as device 210, that includes the processor 202, the storage 204, and the sensors 206. For example, the robotic device 200 may be a robot that has a number of mechanical actuators (e.g., a movable base), and the robot may be configured to receive a mobile telephone to function as the "brains" or control components of the robot. The device 210 may be considered a module of the robot. The device 210 may be physically attached to the robot or in communication with the robot. For example, a mobile phone may sit on a robot's "chest" and form an interactive display. The device 210 may provide a robot with sensors, a wireless link, and processing capabilities, for example. The device 210 may allow a user to download new routines for his or her robot from the cloud. For example, a laundry folding routine may be stored on the cloud, and a user may be able to select this routine using a mobile phone to download the routine from the cloud. When the mobile phone is placed into or coupled to the robot, the robot would be able to perform the downloaded action.

In some examples, the robotic device 200 may be coupled to a mobile or cellular telephone to provide additional sensing capabilities. The cellular phone may not be physically attached to the robot, but may be coupled to the robot wirelessly. For example, a low cost robot may omit a direct connection to the internet. This robot may be able to connect to a user's cellular phone via a wireless technology (e.g., Bluetooth) to be able to access the internet. The robot may be able to access various sensors and communication means of the cellular phone. The robot may not need as many sensors to be physically provided on the robot, however, the robot may be able to keep the same or similar functionality.

Thus, the robotic device 200 may include mechanical robot features, and may be configured to receive the device 210 (e.g., a mobile phone), which can provide additional peripheral components to the robotic device 200, such as any of an accelerometer, gyroscope, compass, GPS, camera, WiFi connection, a touch screen, etc., that are included within the device 210.

FIG. 2B illustrates a graphical example of a robot 212. In FIG. 2B, the robot 212 is shown as a mechanical form of a person including arms, legs, and a head. The robot 212 may be configured to receive any number of modules or components, such a mobile phone, which may be configured to operate the robot. In this example, a device (e.g., robot 212) can be attached to a mobile phone (e.g., device 210) to provide the mechanical robot 212 with functionality enabling the robot 212 to communicate with the cloud to cause operation/functions of the robot 212. Other types of devices that have connectivity to the Internet can be coupled to robot 212 to provide additional functions on the robot 212. Thus, the device 210 may be separate from the robot 212 and can be attached or coupled to the robot 212.

In one example, the robot 212 may be a toy with only limited mechanical functionality, and by connecting the device 210 to the robot 212, the toy robot 212 may now be capable of performing a number of functions with the aid of the device 210 and/or the cloud. In this manner, the robot 212 (or components of a robot) can be attached to a mobile phone to transform the mobile phone into a robot (e.g., with legs/arms) that is connected to a server to cause operation/functions of the robot.

FIG. 2C illustrates another example of a robot 214. The robot 214 includes a computing device 216, sensors 218, and a mechanical actuator 220. In this example, the computing device 216 may be a laptop computer, which may be coupled to the sensors 218. The sensors 218 may include a camera, infrared projectors, and other motion sensing or vision sensing elements. The sensors 218 may be included within a tablet device, which may also function as the computing device 216. The mechanical actuator 220 may include a base, wheels, and a motor upon which the computing device 216 and the sensors 218 can be positioned, for example.

Any of the robots illustrated in FIGS. 2A-2C may be configured to operate according to a robot operating system (e.g., an operating system designed for specific functions of the robot). A robot operating system may provide libraries and tools (e.g., hardware abstraction, device drivers, visualizers, message-passing, package management, etc.) to enable robot applications. Examples of robot operating systems include open source software such as ROS (robot operating system), DROS, or ARCOS (advanced robotics control operating system); proprietary software such as the robotic development platform ESRP from Evolution Robotics® and MRDS (Microsoft® Robotics Developer Studio), and other examples also include ROSJAVA. A robot operating system may include publish and subscribe functionality, and may also include functionality to control components of the robot, such as head tracking, base movement (e.g., velocity control, navigation framework), etc.

Figure 3:
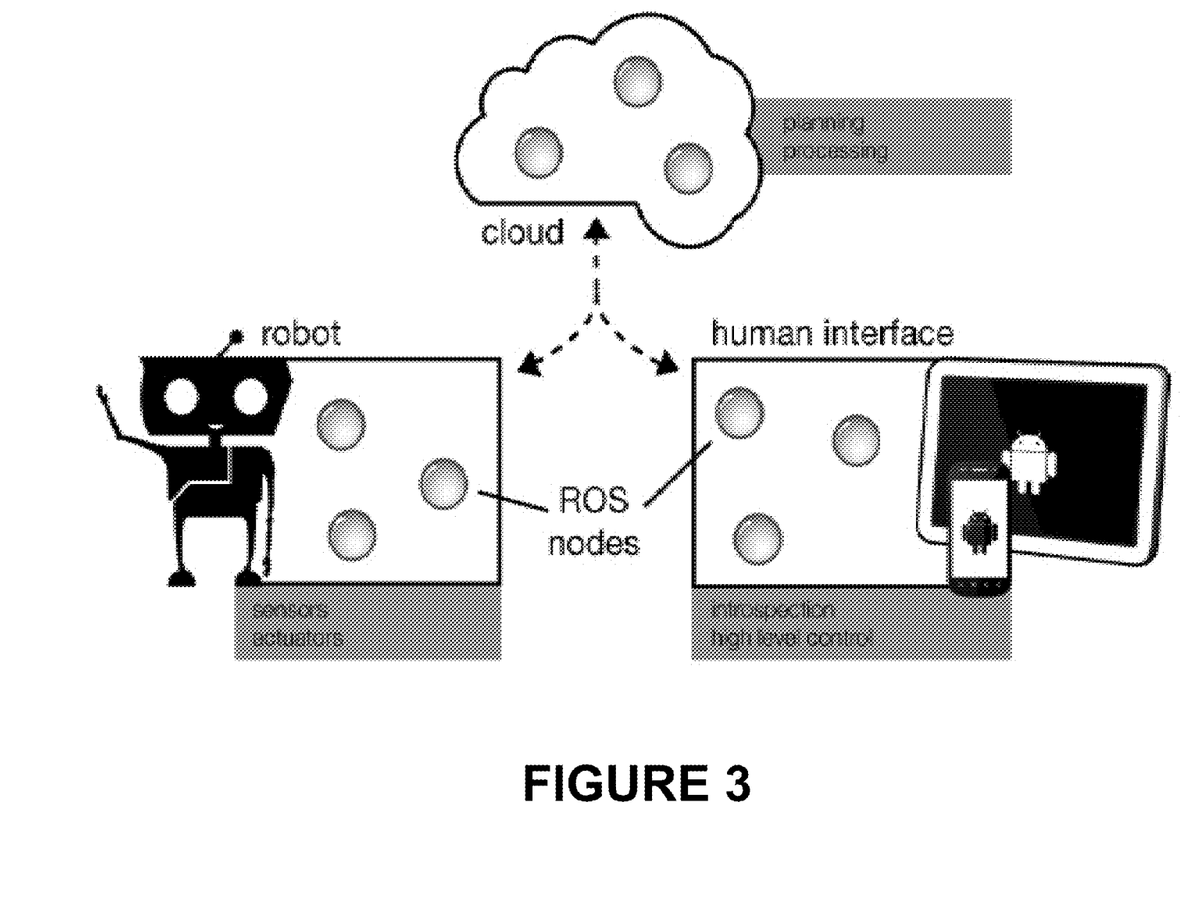
FIG. 3 illustrates an example of a conceptual robot-cloud interaction.

FIG. 3 illustrates an example of a conceptual robot-cloud interaction. A robot, such as a robot described and illustrated in FIG. 2, may connect to a network of computers (e.g., the cloud), and may request data or processing to be performed by the cloud. In one example, the robot may include a number of sensors and mechanical actuators that may generally provide motor control for the robot. Outputs of the sensors, such as camera feeds, vision sensors, etc., may be provided to the cloud, which can process the outputs to enable the robot to perform functions. The cloud may process a camera feed, for example, to determine a location of a robot, perform object recognition, or to indicate a navigation pathway for the robot.

FIG. 3 generally illustrates motor controllers in which each module may conceptually represent a computer or node on the cloud that performs processing using motor controller inputs or data from the robot. FIG. 3 also generally illustrates sensors in which each module may conceptually represent a computer or node on the cloud that performs processing using sensor inputs or data from the robot. FIG. 3 further generally illustrates applications in which each module may conceptually represent a computer or node on the cloud that performs specific functions of a number of applications, e.g., navigation application, mapping application, etc. In addition, FIG. 3 further generally illustrates planning in which each module may conceptually represent a computer or node on the cloud that performs processing for the robot, such as general planning or computing processing.

As shown, any of the modules may be interconnected, and/or may communicate to receive data or instructions from each other so as to provide a specific output or functionality for the robot.

In one example, the robot may send data to a cloud for data processing, and in another example, the robot may receive data from the cloud. The data received from the cloud may be in many different forms. The received data may be a processed form of data the robot sent to the cloud. The received data may also come from sources other than the robot. For example, the cloud may have access to other sensors, other robots, and the internet.

Figure 4:
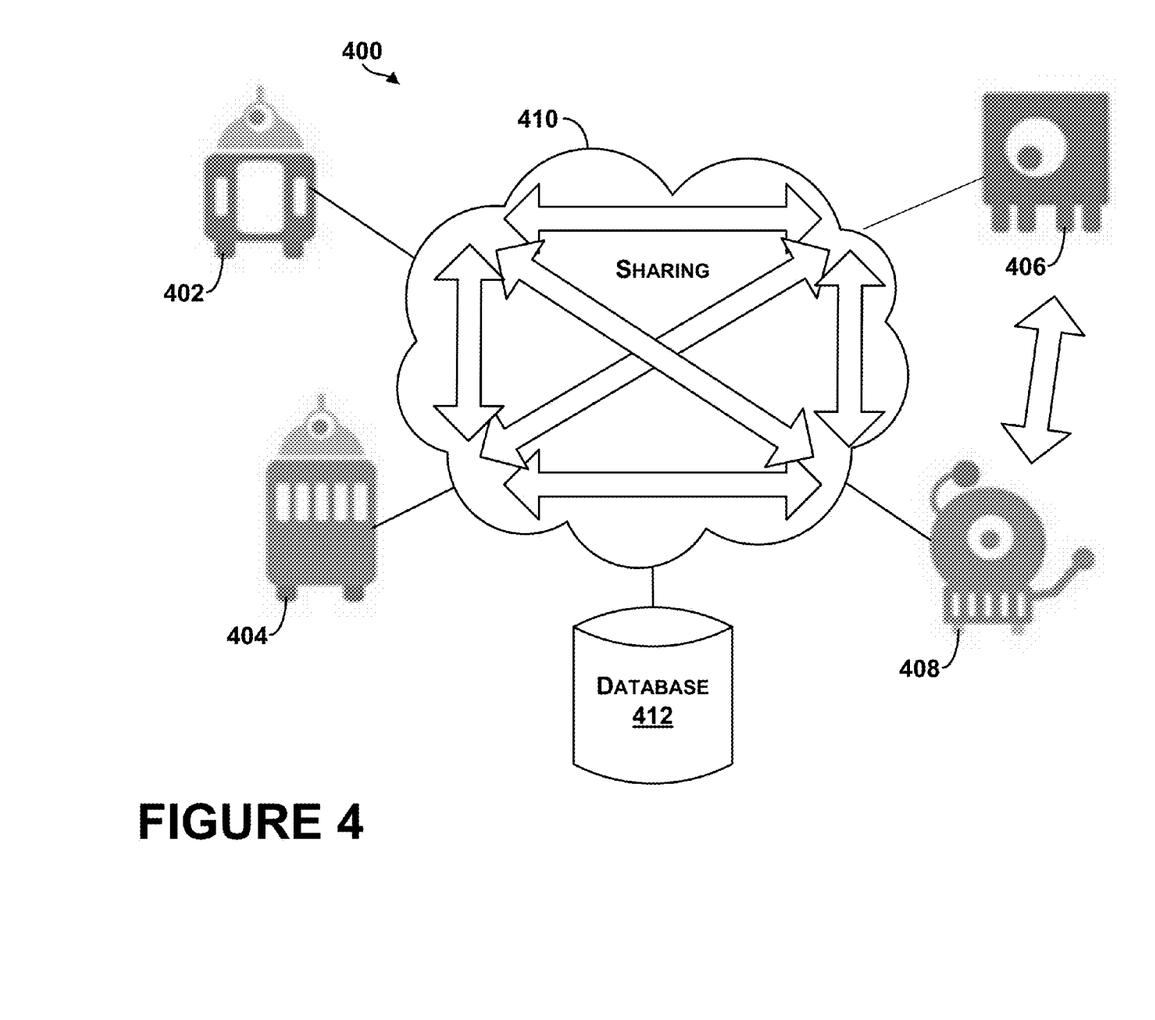
FIG. 4 is an example system in which robotic devices may interact with the cloud and share information with other cloud computing devices.

FIG. 4 is an example system 400 in which robots may interact with the cloud and share information with other cloud computing devices. The system 400 illustrates robots 402, 404, 406, and 408 (e.g., as conceptual graphical representations) each coupled to a cloud 410. Each robot 402, 404, 406, and 408 may interact with the cloud 410, and may further interact with each other through the cloud 410, or through other access points and possibly directly (e.g., as shown between robots 406 and 408).

The cloud 410 may receive input from several robots. Data from each robot may be complied into a larger data set. For example, the robot 402 may take a picture of an object and upload the picture to the cloud 410. An object recognition program in the cloud 410 may be configured to identify the object in the picture and provide data to all the robots connected to the cloud 410 about the recognized object, as well as possibly about other characteristics (e.g., metadata) of the recognized object, such as a location, size, weight, color, etc. Thus, every robot may be able to know attributes of an object in a photo uploaded by the robot 402.

The robots 402, 404, 406 and 408 may perform any number of actions with an area, people, other robots, etc. In one example, each robot 402, 404, 406 and 408 has WiFi or other network based connectivity and will upload/publish data to the cloud 410 that can then be shared with any other robot. In this manner, each robot 402, 404, 406 and 408 shares experiences with each other to enable learned behaviors. Each robot 402, 404, 406, and 408 will have access to real-time up to date data. In another example, the robot 404 can download data indicating images seen by the other robots 402, 406, and 408 to help the robot 404 identify an object using various views (e.g., in instances in which the robots 402, 406, and 408 have captured images of the objects from a different perspective). Overall, the robots 402, 404, 406, and 408 may be configured to share data that is collected to enable faster adaptation, such that each robot 402, 404, 406, and 408 can build upon a learned experience of a previous robot.

In one example, the cloud 410 may include, store, or provide access to a database 412 of information related to objects, and the database 412 may be accessible by all the robots 402, 404, 406, and 408. The database 412 may include information identifying objects, and details of the objects (e.g., mass, properties, shape, instructions for use, etc., any detail that may be associated with the object) that can be accessed by the robots 402, 404, 406, and 408 to perform object recognition. As an example, information regarding use of an object can include, e.g., such as for a phone, how to pick up a handset, how to answer the phone, location of buttons, how to dial, etc.

In addition, the database 412 may include information about objects that can be used to distinguish objects. For example, the database 412 may include general information regarding an object (e.g., such as a computer), and additionally, information regarding a specific computer (e.g., a model number, details or technical specifications of a specific model, etc.). Each object may include information in the database 412 including an object name, object details, object distinguishing characteristics, etc., or a tuple space for objects that can be accessed. Each object may further include information in the database in an ordered list, for example. In further examples, the database 412 may include a global unique identifier (GUID) for objects identified in the database 412 (e.g., to enable distinguishing between specific objects), and the GUID may be associated with any characteristics or information describing the object. Thus, a robot may be configured to access the database 412 to receive information generally distinguishing objects (e.g., a baseball vs. a computer), and to receive information that may distinguish between specific objects (e.g., two different computers).

The database 412 may be accessible by all robots through the cloud 410 (or alternatively directly accessible by all robots without communication through the cloud 410). The database 412 may thus be a shared knowledge base stored in the cloud 410. In some examples, robots may share learned behaviors through the cloud 410. The cloud 410 may have a server that stores robot learned activities or behaviors resulting in a shared knowledge base of behaviors and heuristics for object interactions (e.g., a robot "app store").

Thus, within examples, the robots 402, 404, 406, and 408 may share information through the cloud 410, and may access the database 412. The robots 402, 404, 406, and 408 may access the cloud 410 to perform any number of functions or methods described herein.

Figure 5:
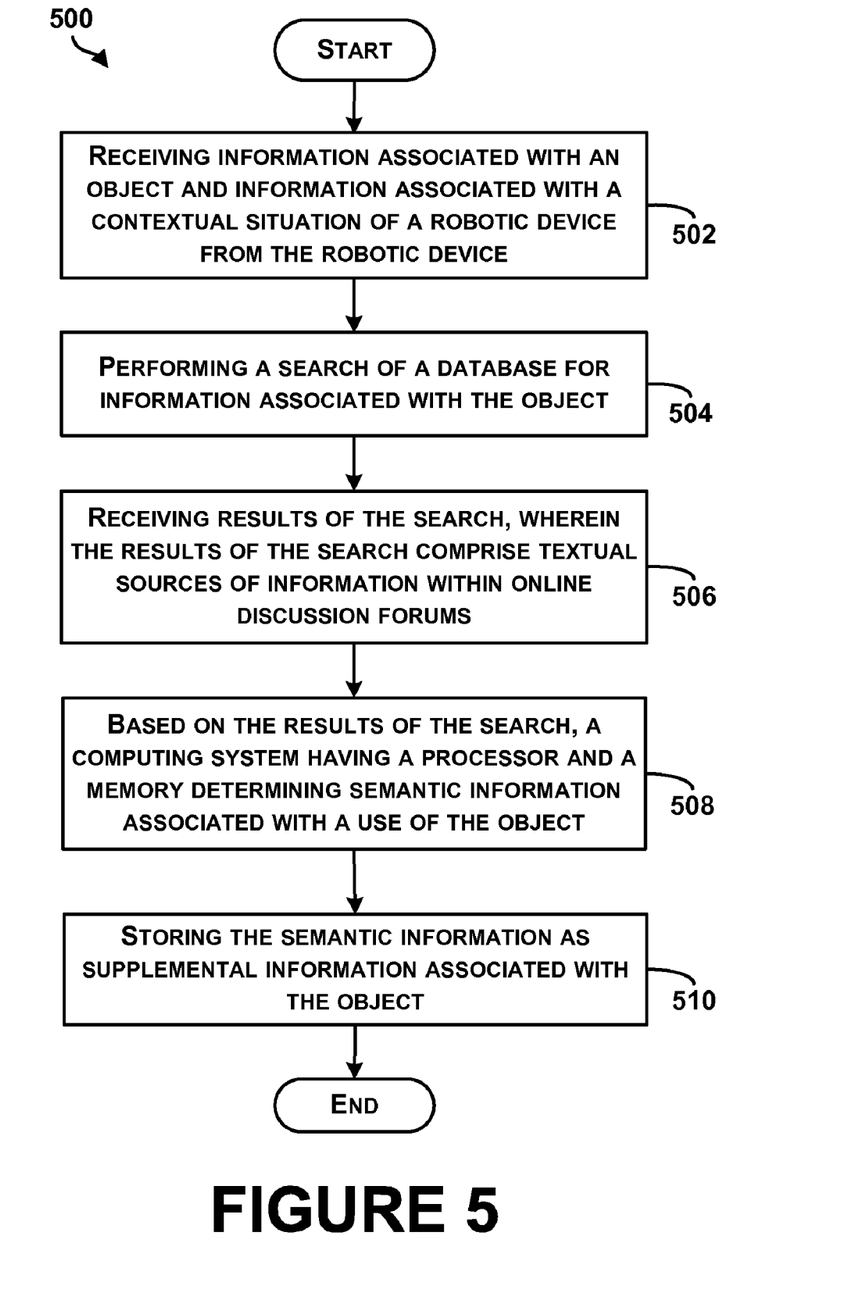
FIG. 5 is a block diagram of an example method of determining semantic information associated with an object, in accordance with at least some embodiments described herein.

FIG. 5 is a block diagram of an example method 500 of determining semantic information associated with an object. Method 500 shown in FIG. 5 presents an embodiment of a method that could be used with the system 100, for example, and may be performed by a device, such as any devices illustrated in FIGS. 1-2, or components of the devices. Method 500 may include one or more operations, functions, or actions as illustrated by one or more of blocks 502-510. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 500 and other processes and methods disclosed herein, each block in FIG. 5 may represent circuitry that is wired to perform the specific logical functions in the process.

At block 502, the method 500 includes receiving information associated with an object and information associated with a contextual situation of a robotic device. In one example, the information associated with the object may include a model of the object. For example, the model may be a three-dimensional model of the object provided by a manufacturer of the object (e.g., a computer-aided design (CAD) drawing with inner working parts and material or other computer model). In another example, the model of the object may be a model generated by a user. In yet another example, the model of the object may include a set of vertices in a three-dimensional coordinate system, such as a point cloud. In one instance, the set of vertices may form polygons that define a shape of an object, such as a surface mesh. The model of the object may be received by a server or by the robotic device from a database storing three-dimensional models of objects in some instances.

In another example, the information associated with the object may include bump mapping (bumps or wrinkles on the surface of an object), texture mapping (detail, surface texture, or color of an object), relief mapping (depictions of self-occlusion, self-shadowing, parallax, etc.), and/or specularity (visual appearances of specular reflections of a surface), optionally mapped to a computer model or a raw three-dimensional model such as a set of vertices in a three-dimensional coordinate system.

In one example, the information associated with the contextual situation may include information associated with an environment in which the robotic device resides, operates, or is configured to operate, such as a location within the environment, additional objects in the environment, or information associated with sensory data in the environment. For example, the sensory data may include audio, visual, or other sensory input received by the robotic device. In other examples, the information associated with the contextual situation may include a task given to the robotic device to perform, information associated with additional objects in the environment, or capabilities of the robotic device.

At block 504, the method 500 includes performing a search of a database for information associated with the object. For example, a document search, an image search, video search, audio search, or product search may be performed based on a model of the object. In one example, a web search may be performed using an internet search engine. The web search may include an image search, document search, video search, audio search, three-dimensional object search, and/or product search, for example. In another example, the information associated with the model of the object may include additional criteria for the search, such as search words, images, etc.

At block 506, the method 500 includes receiving results of the search. In one instance, the results of the search may include information from textual sources of information within online discussion forums (e.g., blog posts, comment threads, forums) and/or videos or images including or associated with the object. In another instance, the results of the search may include information associated with example use cases of the object. For example, a webpage may list information associated with instructions for robotic devices or example use cases of the object for robotic devices. Results of the search may additionally include information associated with example use cases of the object by non-robotic devices (e.g., by humans). In yet another instance, the results of the search may include three-dimensional objects.

At block 508, the method 500 includes a computing system having a processor and a memory determining semantic information associated with a use of the object, based on the results of the search. The results of the search may be analyzed by the computing system to determine information associated with, for example, how the object is used, why the object is used, what the object is used for, or when the object is used. In some examples, the semantic information may be information useful to a robotic device, such as for deriving use cases for a product that may not have been included with a product description of the product. In other examples, the semantic information may be useful for classifying objects into various types, such as things you can throw, things that can get wet, things that will roll, etc.

In an instance in which the results of the search comprise information associated with example use cases of the object, the use case of the object may be determined based on the information associated with the contextual situation of the robotic device. In an example where the contextual situation of the robotic device includes capabilities of the robotic device, the use case of the object may be determined based on the capabilities of the robotic device.

In a further example, the results of the search may also comprise information identifying the object, and an additional search on a given database for information associated with example uses cases of the identified object may also be performed.

In an instance in which the information associated with the object is received from a database of object models, a relationship between the object and at least one additional object in the object database may be determined. For example, the object may be a pair of boots, and a search may be performed based on a model of the boots. The results of the search and the semantic information may reveal a number of kinds of boots (e.g., cowboy boots, knee-high boots, rain boots, hiking boots, skiing boots), for which a model of each also exists in the database, and associations between the boots and number of kinds of boots may be noted in the database as supplemental information associated with the boots.

At block 510, the method 500 includes storing the semantic information as supplemental information associated with the object. The semantic information may be stored within a memory of the robotic device, for example, as information associated with the object. In other examples, the semantic information may be stored as supplemental information associated with the object within a database of a computer or network of computational resources.

In one instance, the method 500 may be performed by the robotic device. For example, the method 500 may be an automated process to augment information about objects that the robotic device encounters. In one example, the robotic device may determine the information associated with the object and the information associated with the contextual situation. The robotic device may further request semantic information associated with the object. In another example, the method 500 may be performed by the robotic device to accomplish a task, and semantic information may be determined that is used by the robotic device in order to complete the task, such as interacting with the object utilizing the semantic information.

In another instance in which the method 500 is performed by the robotic device, the method 500 may include a computing system of the robotic device performing a search of a database for information associated with the object, and the computing system of the robotic device determining the semantic associated with the object based on the results of the search. For example, the robotic device performing the search may include the robotic device sending a search query to a search engine configured to search the database. The robotic device may also receive the results of the search by the search engine.

In another example, the robotic device may encounter an object. The robotic device may capture information associated with the object and upload the object to a cloud for recognition. For example, the robotic device may capture information creating a point cloud of the object, the cloud may identify the object based on the point cloud, and send a three-dimensional model of the object or identity of the object to the robotic device. A database may contain a three dimensional model of the object, but include limited information about the object useful to the robotic device. A search for information associated with the object may reveal multiple nicknames or a commonly used brand name to refer to the object. The robotic device may record audio information from the environment, and translate the audio information into text (e.g., using speech recognition). Based on an analysis of the text, text surrounding or containing nicknames or brand names for the object may be determined to be relevant semantic information. In one instance, the text may reveal a use case of the object or characteristic of the object.

In another instance, the method 500 may be performed by a server. In one example, the method 500 may further include receiving data gathered by the robotic device, from the robotic device, associated with a number of objects in an area. Object recognition may be performed by a process associated with the server on the gathered data to identify the object, and determined semantic information about the object may be sent to the robotic device.

In another instance in which the method 500 is performed by a server, the method 500 may further include receiving from the robotic device an indication of the robotic device interacting with the object. The determined semantic information may be sent to the robotic device, and information associated with an interaction with the object by the robotic device utilizing the semantic information may be received by the server.

Figure 6:
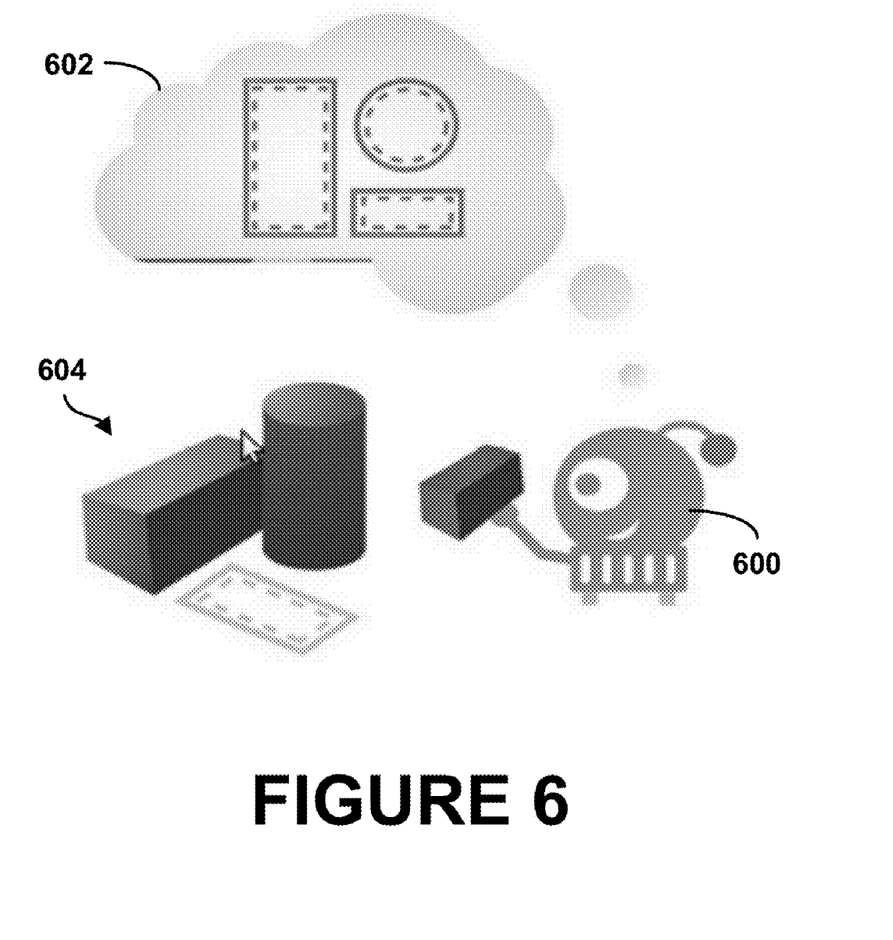
FIG. 6 is an example conceptual illustration of a robotic device interacting with a cloud to perform object recognition.

FIG. 6 is an example conceptual illustration of a robotic device 600 interacting with a cloud 602 to perform object recognition. The robotic device 600 may interact with an object (such as any of objects 604), and interact with the cloud 602 to determine semantic information associated with the object. For example, the robotic device 600 may capture one or more images of an object using any number of sensors, such as a camera (still pictures or video feeds), infrared projectors, etc. In some examples, the robotic device 600 may optionally capture information associated with characteristics about the object. In one instance, the robotic device 600 may determine or record a weight, dimensions, a texture, color, or any type of physical attribute of the object. A process in the cloud may determine semantic information (e.g., using one or more blocks of the method 500 of FIG. 5) and send the semantic information to the robotic device. In some examples, the robotic device 600 may further interact with the object based on the semantic information.

In other examples, the robotic device 600 may communicate with the object, such as by accessing memory of the object, to obtain additional data. For instance, if the object has communication capabilities, such as Wi-Fi, Bluetooth, infrared, or other wireless or wired methods, the robotic device 600 may communicate with the object to determine any type of data. Additionally, the object may have serial/parallel ports through which the robotic device may communicate with the object.

In one example, the robotic device 600 may query a computing device with the captured image and/or information. As an example, the robotic device 600 may query the cloud with a captured image by sending the captured image to the cloud and requesting information about the image, such as an identity of the image or information associated with characteristics of objects in the image. Alternatively the robotic device 600 may query another robotic device directly to request information about the object, such as an image of an alternate view of the object.

Information associated with the object may be received by the robotic device 600 in some examples. For example, the robotic device 600 may receive data from the cloud describing a two-dimensional and/or three-dimensional model of the object, data indicating an identity of an object in the image, or other information related to or associated with characteristics about the object. In some examples, the cloud may perform object recognition on an uploaded image or video. For example, if a picture was taken in a living room, the cloud may be able to identify a television and provide a three-dimensional model of the television.

As an additional or alternative method for performing object recognition, objects may be tagged with a type of identifier (e.g., radio frequency identification (RFID) chip, near field communication chip (NFC), bar code, etc.), so that the robotic device 600 may include an application enabling the robotic device 600 to identify the object based on the identifier. The identifier may provide information about the object including an identification, details of the object (mass, color, type, brand, etc.), a location of the object, etc. In some examples, objects may emit beacons that can be received by robotic devices to determine existence/identification/location of the object. In this example, a physical environment may be instrumented with beacons in forms of NFC, RFID, QR codes, etc. to enable the robotic device 600 to localize and identify objects. Beacons may be stationary beacons or moving beacons (RFID in an employee's ID badge) to perform tracking of objects.

Figure 7:
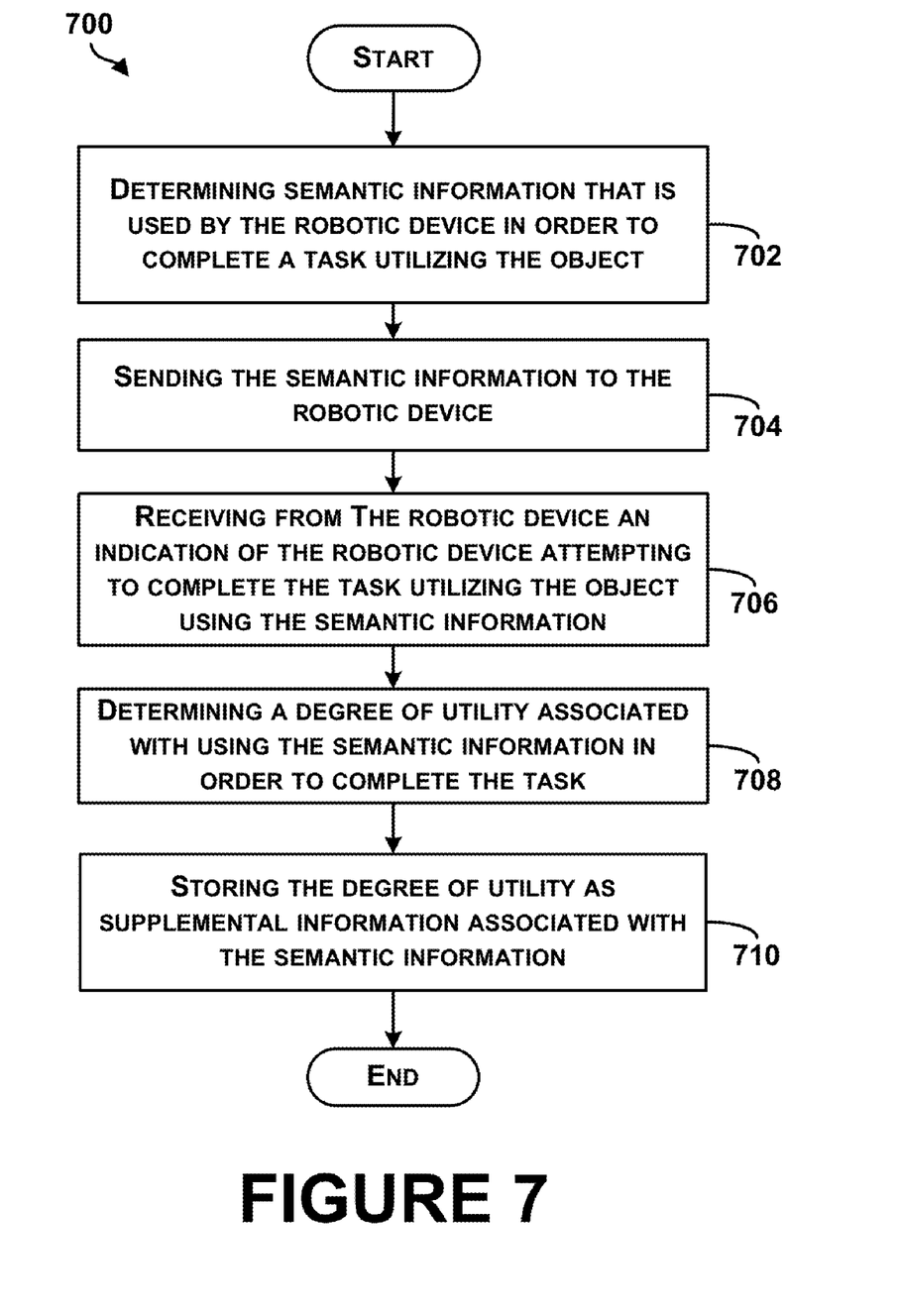
FIG. 7 is a block diagram of another example method.

FIG. 7 is a block diagram of another example method 700. The method 700 shown in FIG. 7 presents an embodiment of a method that may, for example, be used by the system 100 of FIG. 1. Method 700 may include one or more operations, functions, or actions as illustrated by one or more of blocks 702-710. Although the blocks are illustrated in a sequential order, these blocks may also be performed in parallel, and/or in a different order than those described herein. Also, the various blocks may be combined into fewer blocks, divided into additional blocks, and/or removed from the method, based upon the desired implementation of the method. Each block may represent a module, a segment, or a portion of program code, which includes one or more instructions executable by a processor for implementing specific logical functions or steps in the process. In addition, each block in FIG. 7 may represent circuitry that is wired to perform the specific logical functions in the process. In one instance, one or more of blocks 702-710 may be combined with the method 500 of FIG. 5.

At block 702, the method 700 includes determining semantic information that is used by the robotic device in order to complete a task utilizing the object. In an instance where semantic information associated with a use case of an object for a robotic device has been determined, a task utilizing the object may be assigned to the robotic device. For example, the task may require instructions for use in order for the robotic device to interact with the object. Determining the semantic information may include determining instructions for use of the object. In one example, the task may be to attach a stack of documents together using a stapler, and the semantic information may include instructions for use of the stapler.

At block 704, the method 700 includes sending the semantic information to the robotic device. For example, a server may send determined semantic information to the robotic device via any of variety of communication methods.

At block 706, the method 700 includes receiving form the robotic device an indication of the robotic device attempting to complete the task utilizing the object using the semantic information. In the instance in which the task is to attach a stack of documents together, the robotic device may apply instructions for use of the stapler and attempt to staple the documents.

At block 708, the method 700 includes determining a degree of utility associated with using the semantic information in order to complete the task. The degree of utility may include information associated with whether the task was completed by the robotic device using the semantic information. In some examples, the degree of utility may be a rating on a scale of 1-10, where a rating of ten is indicative of a successfully completed task, and a rating of one is indicative of a task that is not completed. In other examples, the degree of utility may be determined based on a binary decision between success and failure.

At block 710, the method 700 includes storing the degree of utility as supplemental information associated with the semantic information. In some examples, the stored information and semantic information may be based on the degree of utility. In other examples, the stored information may be available to other robotic devices via a cloud. In one example, the semantic information available to other robotic devices may be ranked based on the degree of utility logged by the robotic device from prior experience.

Figure 8:
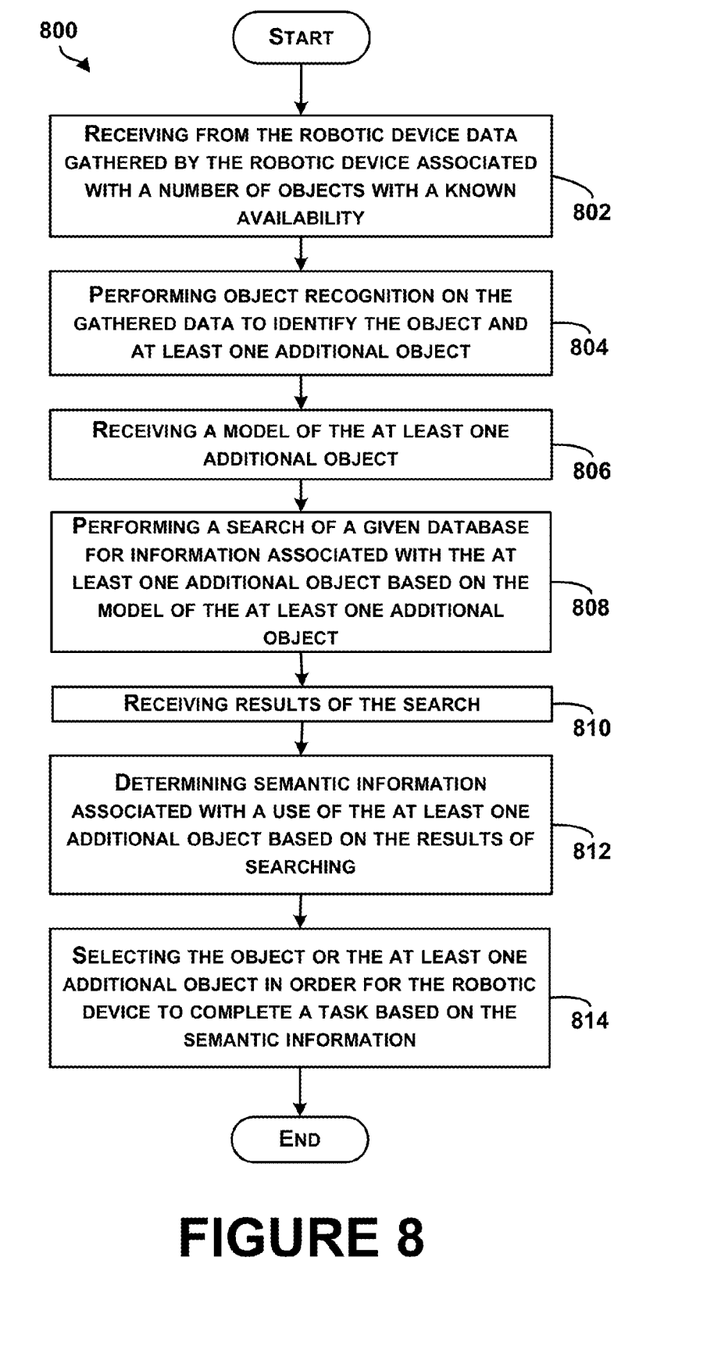
FIG. 8 is a block diagram of still another example method.

FIG. 8 is a block diagram of still another example method 800. The method 800 shown in FIG. 8 presents an embodiment of a method that may, for example, be used by the system 100 of FIG. 1. Method 800 may include one or more operations, functions, or actions as illustrated by one or more of blocks 802-814. Although the blocks are illustrated in a sequential order, these blocks may also be performed in parallel, and/or in a different order than those described herein. Also, the various blocks may be combined into fewer blocks, divided into additional blocks, and/or removed from the method, based upon the desired implementation of the method. Each block may represent a module, a segment, or a portion of program code, which includes one or more instructions executable by a processor for implementing specific logical functions or steps in the process. In addition, each block in FIG. 8 may represent circuitry that is wired to perform the specific logical functions in the process. In one instance, one or more of blocks 802-814 may be combined with the method 500 of FIG. 5.

At block 802, the method 800 includes receiving from the robotic device data gathered by the robotic device associated with a number of objects with a known availability. For example, the robotic device may capture one or more images of a plurality of objects on a table, in a drawer, or in a room. The number of objects may have known availability based on knowledge of locations of the objects, for example.

At block 804, the method 800 includes performing object recognition on the gathered data to identify the object and at least one additional object. In an instance where a robotic device has determined semantic information associated with an object, the object and at least one additional object may be identified from the gathered data. In another instance, the object recognition may identify at least two objects for which no semantic information is available.

At block 806, the method 800 includes receiving a model of the at least one additional object. For example, the model may be a model provided by a manufacturer of the object or generated by a user, and may be two-dimensional and/or three-dimensional.

At block 808, the method 800 includes performing a search of a given database for information associated with the at least one additional object based on the model of the at least one additional object. In one example, performing the search may include performing a search using an internet search engine. In another example, the information associated with the model of the object may include additional criteria for the search.

At block 810, the method 800 includes receiving results of the search. In one instance, the results of the search may include textual sources of information within online discussion forums (e.g., blog posts, comment threads, forums) and/or videos or images including or associated with the object. In another instance, the results of the search may include information associated with example use cases of the object.

At block 812, the method 800 includes determining semantic information associated with a use of the at least one additional object based on the results of searching. The results of the search may be analyzed to determine information associated with, for example, how the object is used, why the object is used, what the object is used for, or when the object is used. In some examples, the semantic information may be information useful to a robotic device, such as for deriving use cases for a product that may not have been included within a product description of the product on a retail website. In other examples, the semantic information may be useful for classifying objects into various types, such as things you can throw, things that can get wet, things that will roll, etc.

In one example, the results of the search may include a log of degrees of utility associated with semantic information used by another robotic device to complete a task. The semantic information may be determined by identifying semantic information associated with a maximum degree of utility among semantic information with an associated degree of utility available.

At block 814, the method 800 includes selecting the object or the at least one additional object in order for the robotic device to complete a task based on the semantic information. In an instance where semantic information associated with the object has been determined, the semantic information associated with the object may be compared with the semantic information associated with a use of the at least one additional object.

In one example, the task may be to determine if a surface is level without the availability of a level. The number of objects may include typical objects found on an office desk, such as a pencil, a paper weight, a paperclip, a sheet of paper, etc. The semantic information associated with the pencil may indicate many use cases including, for example, writing, reaching under small spaces to retrieve something, pushing a small button, making a rubber band launcher, using the pencil as a level, snapping it, etc. Based on the semantic information, the pencil may be retrieved and selected to determine if the surface is level.

In another example, the robotic device may use knowledge of the number of objects with known availability in order to combine multiple objects to perform a task. For example, semantic information associated with how to use the object and the at least one additional object identified at block 804 together to perform a task may be determined. Thus, in some examples, based on the semantic information, the object and the at least one additional object may both be selected in order for the robotic device to complete the task.

Figure 9:
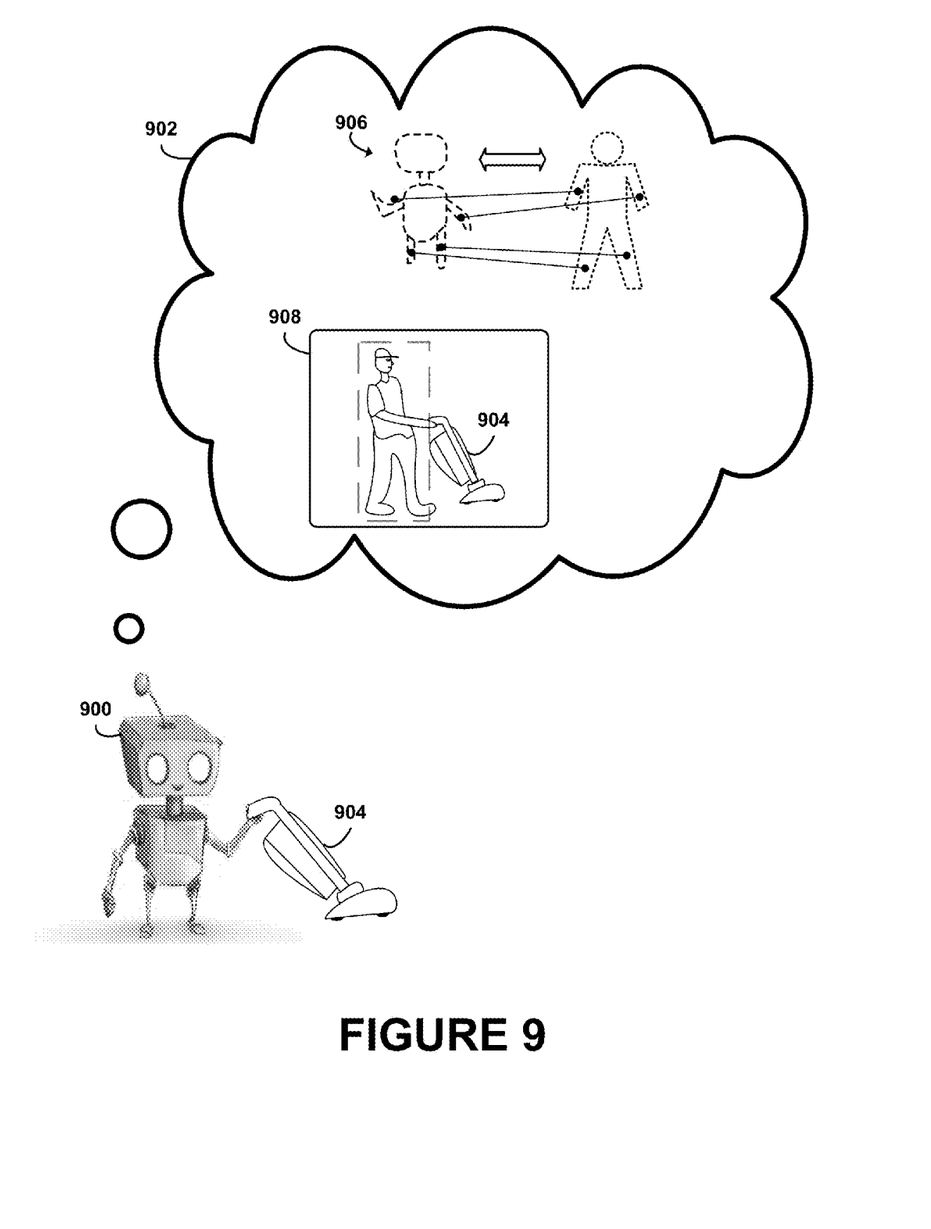
FIG. 9 is an example conceptual illustration of a robotic device interacting with a cloud to determine semantic information.

FIG. 9 is an example conceptual illustration of a robotic device 900 interacting with a cloud 902 to determine semantic information. In one example, results of a search for information associated with an object 904 may include videos associated with the object 904. Determining semantic information may include comparing a robot model 906 of a human to a human interaction with the object 904 in a given video 908, and determining information associated with emulating the human interaction based on a mapping between the robot model 906 and the human interaction.

In one example, a process may analyze videos returned with the results of the search to determine use cases for the object 904. In one instance, videos including humans interacting with the object 904 may be determined. An image matching or recognition process may be used to determine how the human interacts with the object 904. For example, the object 904 may be a vacuum, and a determination may be made that a human holds a handle of the vacuum while pushing the vacuum over a floor or rug. Based on a mapping between the robot model 906 and the human interaction, the robotic device 900 may hold the handle of the vacuum while attempting to vacuum a surface. In a further example, the video 908 (or another video or image) may include a human holding a power cord for the vacuum in another hand or plugging the power cord into a wall outlet, and the robotic device 900 may determine a need to hold the power cord as well while vacuuming, or plug the power cord into a wall outlet prior to vacuuming.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   receiving, by a computing system having a processor and a memory, information associated with an object;
   performing, by the computing system, a search of a database for additional information associated with the object;
   receiving results of the search, wherein the results of the search comprise videos associated with the object;
   comparing, by the computing system, a robot model of a human to a human interaction with the object that occurs in a given video;
   determining, by the computing system, semantic information associated with emulating the human interaction based on a mapping between the robot model and the human interaction; and
   storing, by the computing system, the semantic information as supplemental information associated with the object.

2. The method of claim 1, further comprising:
   receiving from a robotic device an indication of the robotic device interacting with the object;
   sending the semantic information to the robotic device; and
   receiving information associated with an interaction with the object by the robotic device utilizing the semantic information.

3. The method of claim 1, wherein the information associated with the object includes a three-dimensional model of the object stored in a three-dimensional object database.

4. The method of claim 3, further comprising determining a relationship between the object and at least one additional object of the object database.

5. The method of claim 1, further comprising receiving information associated with a contextual situation of a robotic device, wherein the information associated with the contextual situation includes information associated with one of a location of the robotic device, a task given to the robotic device to perform, capabilities of the robotic device, information associated with additional objects in the environment, and information associated with sensory data received by the robotic device.

6. The method of claim 1, wherein the semantic information further includes information describing one or more of: how the object is used, why the object is used, what the object is used for, and when the object is used.

7. The method of claim 1, further comprising:
   receiving from a robotic device data gathered by the robotic device and associated with a number of objects in an area;
   performing object recognition on the gathered data to identify the object; and
   sending the semantic information to the robotic device.

8. The method of claim 1, further comprising:
   receiving from a robotic device data gathered by the robotic device and associated with a number of objects with a known availability;
   performing object recognition on the gathered data to identify the object and at least one additional object;
   performing a second search of a given database for information associated with the at least one additional object;
   determining semantic information associated with a use of the at least one additional object based on the results of the second search; and selecting the object or the at least one additional object in order for the robotic device to complete a task based on the semantic information associated with the use of the at least one additional object.

9. A method comprising:

receiving, by a computing system having a processor and a memory, information associated with an object;

performing, by the computing system, a search of a database for additional information associated with the object;

receiving results of the search;

analyzing, by the computing system, the results of the search to derive semantic information that is used by a robotic device in order to complete a task utilizing the object;

sending the semantic information to the robotic device;

receiving from the robotic device an indication of the robotic device attempting to complete the task utilizing the object using the semantic information;

determining a degree of utility associated with using the semantic information in order to complete the task, wherein the degree of utility includes information associated with whether the task was completed by the robotic device using the semantic information; and storing the degree of utility as supplemental information associated with the semantic information.

10. The method of claim 9, wherein receiving results of the search comprises receiving information associated with one or more of webpages, images, videos, audio files, and three-dimensional objects.

11. The method of claim 9, wherein receiving results of the search comprises receiving textual sources of information within online discussion forums.

12. The method of claim 9, wherein receiving results of the search comprises receiving information associated with example use cases of the object, and the method further comprises:

determining from among the example use cases of the object the use case of the object for the robotic device based on the information associated with the contextual situation of the robotic device.

13. The method of claim 9, wherein receiving results of the search comprises receiving information identifying the object, and the method further comprises:

based on the information identifying the object, performing a second search on a given database for information associated with example use cases of the object; and determining from among the example use cases of the object a use case of the object for the robotic device based on information associated with a contextual situation of the robotic device.

* * * * *